(12) United States Patent
Chui et al.

(10) Patent No.: US 7,466,572 B1
(45) Date of Patent: Dec. 16, 2008

(54) THREE PHASE VOLTAGE TRIPLER

(75) Inventors: Siew Yong Chui, Singapore (SG); Jye Sheng Hong, Singapore (SG)

(73) Assignee: Marvell International Ltd., Hamilton (BM)

( * ) Notice: Subject to any disclaimer, the term of this patent is extended or adjusted under 35 U.S.C. 154(b) by 233 days.

(21) Appl. No.: 11/585,566

(22) Filed: Oct. 24, 2006

Related U.S. Application Data

(60) Provisional application No. 60/790,731, filed on Apr. 10, 2006.

(51) Int. Cl.
*H02M 3/18* (2006.01)
(52) U.S. Cl. ...................................................... 363/60
(58) Field of Classification Search .................. 363/59, 363/60; 327/536
See application file for complete search history.

(56) References Cited

U.S. PATENT DOCUMENTS 5,463,542 A * 10/1995 Okamoto ..................... 363/60

* cited by examiner

*Primary Examiner*—Shawn Riley

(57) ABSTRACT

A three-phase voltage tripler includes first, second, and third capacitive elements and a switching module. The switching module selectively switches connections among the capacitive elements and between the capacitive elements and a reference voltage during first, second, and third periods. The switching module charges the first capacitive element to a first voltage level during the first period, the second capacitive element to a second voltage level during the second period, and the third capacitive element to a third voltage level during the third period. The third voltage level is greater than the second voltage level and the second voltage level is greater than the first voltage level.

24 Claims, 17 Drawing Sheets

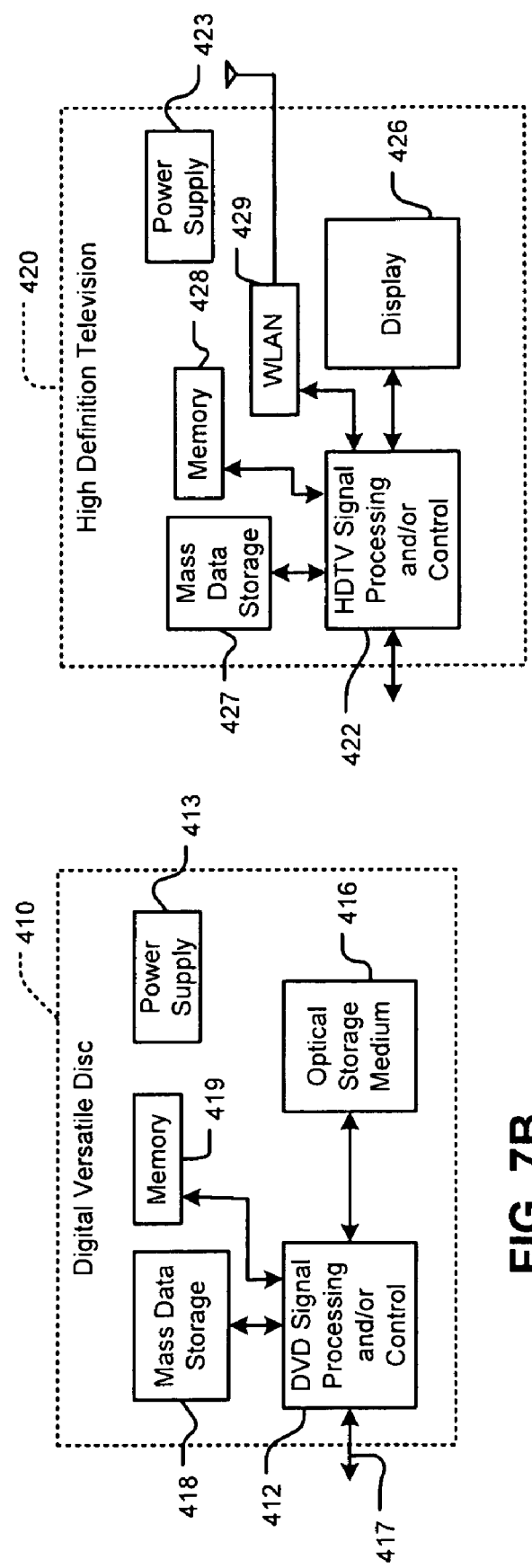

THREE PHASE VOLTAGE TRIPLER

CROSS-REFERENCE TO RELATED APPLICATIONS

This application claims the benefit of U.S. Provisional Application No. 60/790,731, filed on Apr. 10, 2006. The disclosure of the above application is incorporated herein by reference in its entirety.

FIELD

The present disclosure relates to power supply circuits, and more particularly to voltage tripler circuits.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Circuits in many electrical and electronic devices can be powered by batteries. Referring now to FIGS. 1A-1B, a battery 10 may output a voltage $V_{dd}$ to a circuit generally called a load 12. The load 12 may draw varying amounts of current from the battery 10. The voltage $V_{dd}$ may vary depending on the amount of current drawn by the load 12. Additionally, $V_{dd}$ may decrease over time as shown by line 20 in FIG. 1B as the battery 10 gets used.

When the load 12 instantaneously draws a large amount of current from the battery 10, $V_{dd}$ may drop or dip momentarily before returning to a value that is less than or equal to $V_{dd}$. Momentary drops in $V_{dd}$ are called voltage spikes in $V_{dd}$. The amount of drop in $V_{dd}$ may be proportional to the amount of current instantaneously drawn by the load 12.

For example, the drop in $V_{dd}$ may be small (i.e., the voltage spike may be small) as shown at 22 when the amount of current instantaneously drawn is small. On the other hand, the drop in $V_{dd}$ may be large (i.e., the voltage spike may be large) as shown at 24 when the amount of current instantaneously drawn is large.

Thus, voltage spikes in $V_{dd}$ momentarily decrease $V_{dd}$. When voltage spikes decrease $V_{dd}$ below a threshold voltage $V_{threshold}$, a reset may be triggered that resets the load 12 as shown at 26 and 28. Large voltage spikes may trigger the reset even when the battery 10 is relatively new as shown at 26. On the other hand, small voltage spikes may easily trigger the reset when the battery 10 gets relatively old as shown at 28. Thus, limiting the drops or voltage spikes in $V_{dd}$ may minimize triggers that reset the load 12 and may increase life of the battery 10.

SUMMARY

A three-phase voltage tripler comprises first, second, and third capacitive elements and a switching module. The switching module selectively switches connections among the capacitive elements and between the capacitive elements and a reference voltage during first, second, and third periods. The switching module charges the first capacitive element to a first voltage level during the first period, the second capacitive element to a second voltage level during the second period, and the third capacitive element to a third voltage level during the third period. The third voltage level is greater than the second voltage level and the second voltage level is greater than the first voltage level.

In another feature, the first voltage level is approximately equal to the reference voltage, the second voltage level is approximately equal to two times the first voltage level, and the third voltage is approximately equal to three times the first voltage level.

In another feature, the switching module comprises a plurality of switches and a clock module that generates clock signals that selectively control the plurality of switches.

In another feature, the plurality of switches comprise first, second, and third transistors. The first transistor has a first terminal that communicates with the reference voltage, a control terminal, and a second terminal that communicates with a first end of the first capacitive element. The second transistor has a first terminal that communicates with the second terminal of the first transistor, a control terminal, and a second terminal that communicates with a first end of the second capacitive element. The third transistor has a first terminal that communicates with the second terminal of the second transistor, a control terminal, and a second terminal that communicates with a first end of the third capacitive element. The clock module selectively biases the first, second, and third transistors during the first, second, and third periods.

In another feature, substantially the same peak current is drawn during the first, second, and third periods from a source of the reference voltage when the three-phase voltage tripler supplies a predetermined load current.

In another feature, during the first period, a first end of the first capacitive element communicates with the reference voltage and a second end of the first capacitive element communicates with a common voltage.

In another feature, during the second period, the first end of the first capacitive element communicates with a first end of the second capacitive element, the second end of the first capacitive element communicates with the reference voltage, and a second end of the second capacitive element communicates with the common voltage.

In another feature, during the third period, the first end of the second capacitive element communicates with a first end of the third capacitive element, the second end of the second capacitive element communicates with the reference voltage, and a second end of the third capacitive element communicates with the common voltage.

In still other features, a method comprises arranging first, second, and third capacitive elements and selectively switching connections among the capacitive elements and between the capacitive elements and a reference voltage during first, second, and third periods. The method further comprises charging the first capacitive element to a first voltage level during the first period, the second capacitive element to a second voltage level during the second period, and the third capacitive element to a third voltage level during the third period. The third voltage level is greater than the second voltage level and the second voltage level is greater than the first voltage level.

In another feature, the first voltage level is approximately equal to the reference voltage, the second voltage level is approximately equal to two times the first voltage level, and the third voltage is approximately equal to three times the first voltage level.

In another feature, the method further comprises arranging a plurality of switches, generating clock signals that selectively control the plurality of switches, and communicating among the capacitive elements, the switches, and the reference voltage based on the clock signals.

In another feature, the method further comprises including first, second, and third transistors in the switches, wherein each of the transistors has first, second, and control terminals. The method further comprises communicating between the first terminal of the first transistor and the reference voltage and communicating between the second terminal of the first transistor and a first end of the first capacitive element. The method further comprises communicating between the first terminal of the second transistor and the second terminal of the first transistor and communicating between the second terminal of the second transistor and a first end of the second capacitive element. The method further comprises communicating between the first terminal of the third transistor and the second terminal of the second transistor and communicating between the second terminal of the third transistor and a first end of the third capacitive element. The method further comprises communicating the clock signals to the control terminals of the transistors and selectively biasing the transistors during the first, second, and third periods.

In another feature, the method further comprises drawing substantially the same peak current during the first, second, and third periods from a source of the reference voltage when supplying a predetermined load current.

In another feature, the method further comprises communicating during the first period between a first end of the first capacitive element and the reference voltage, and between a second end of the first capacitive element and a common voltage.

In another feature, the method further comprises communicating during the second period between the first end of the first capacitive element and a first end of the second capacitive element, between the second end of the first capacitive element and the reference voltage, and between a second end of the second capacitive element and the common voltage.

In another feature, the method further comprises communicating during the third period between the first end of the second capacitive element and a first end of the third capacitive element, between the second end of the second capacitive element and the reference voltage, and between a second end of the third capacitive element and the common voltage.

In still other features, a three-phase voltage tripler comprises first, second, and third capacitive means for providing capacitance and switching means for selectively switching connections among the capacitive means and between the capacitive means and a reference voltage during first, second, and third periods. The switching means charges the first capacitive means to a first voltage level during the first period, the second capacitive means to a second voltage level during the second period, and the third capacitive means to a third voltage level during the third period. The third voltage level is greater than the second voltage level and the second voltage level is greater than the first voltage level.

In another feature, the first voltage level is approximately equal to the reference voltage, the second voltage level is approximately equal to two times the first voltage level, and the third voltage is approximately equal to three times the first voltage level.

In another feature, the switching means comprises a plurality of switches and clock means for generating clock signals that selectively control the plurality of switches.

In another feature, the plurality of switches comprise first, second, and third transistors. The first transistor has a first terminal that communicates with the reference voltage, a control terminal, and a second terminal that communicates with a first end of the first capacitive means. The second transistor has a first terminal that communicates with the second terminal of the first transistor, a control terminal, and a second terminal that communicates with a first end of the second capacitive means. The third transistor has a first terminal that communicates with the second terminal of the second transistor, a control terminal, and a second terminal that communicates with a first end of the third capacitive means. The clock means selectively biases the first, second, and third transistors during the first, second, and third periods.

In another feature, substantially the same peak current is drawn during the first, second, and third periods from a source of the reference voltage when the three-phase voltage tripler supplies a predetermined load current.

In another feature, during the first period, a first end of the first capacitive means communicates with the reference voltage and a second end of the first capacitive means communicates with a common voltage.

In another feature, during the second period, the first end of the first capacitive means communicates with a first end of the second capacitive means, the second end of the first capacitive means communicates with the reference voltage, and a second end of the second capacitive means communicates with the common voltage.

In another feature, during the third period, the first end of the second capacitive means communicates with a first end of the third capacitive means, the second end of the second capacitive means communicates with the reference voltage, and a second end of the third capacitive means communicates with the common voltage.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7B is a functional block diagram of a digital versatile disk (DVD);

FIG. 7C is a functional block diagram of a high definition television;

DETAILED DESCRIPTION

Figure 1A:
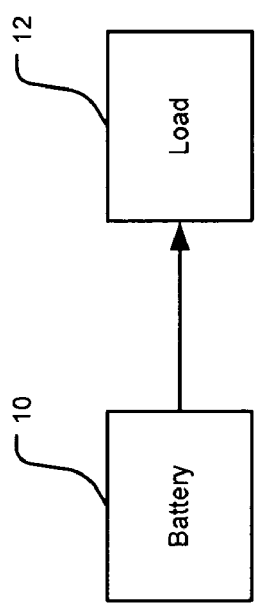
FIG. 1A is a functional block diagram of a battery-operated circuit according to the prior art.
Figure 1B:
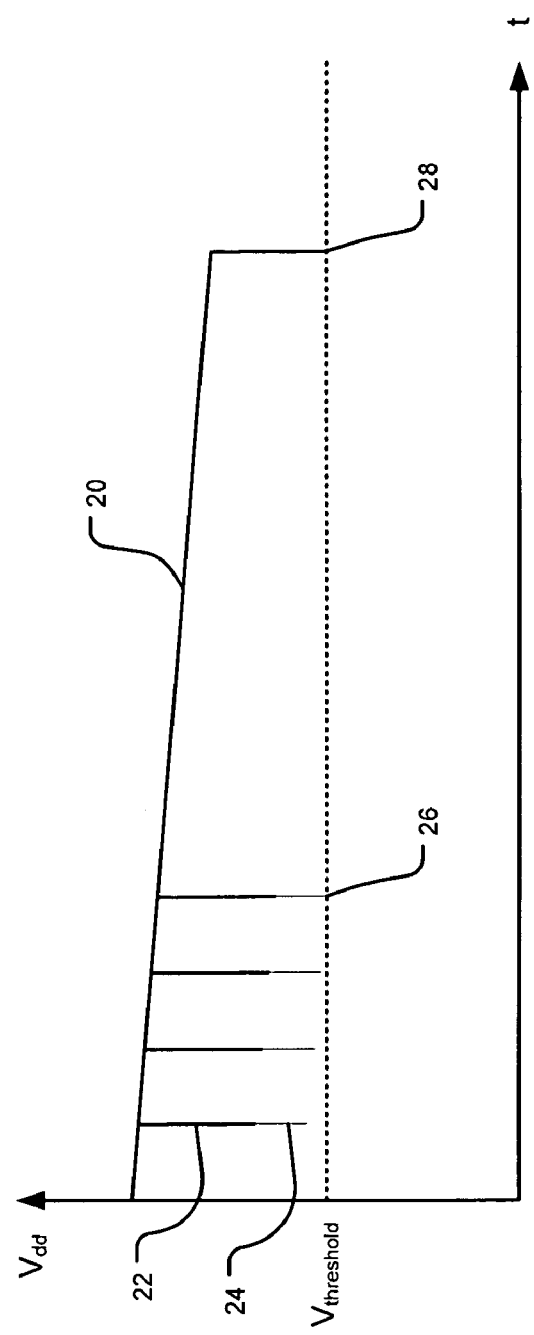
FIG. 1B is a graph of output voltage of a battery relative to time showing voltage spikes generated by peak current drawn by a load according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2A:
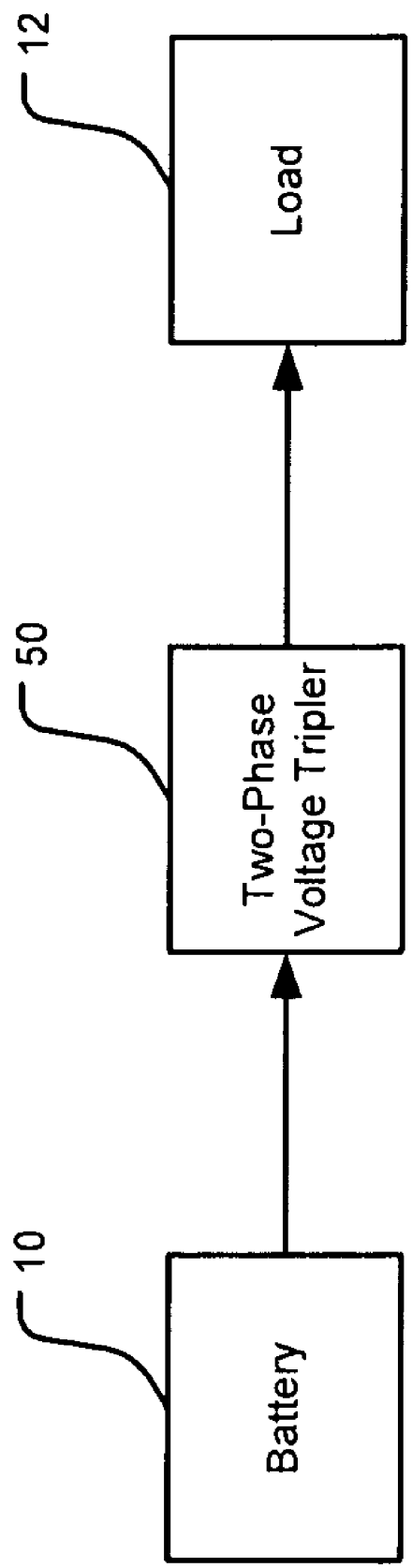
FIG. 2A is a functional block diagram of a two-phase voltage tripler.

Voltage triplers are circuits that triple an output voltage of a voltage source. Referring now to FIGS. 2A-2E, a two-phase voltage tripler (tripler) 50 triples an output voltage $V_{dd}$ of a battery 10 as shown in FIG. 2A. The tripler 50 outputs a voltage equal to $3V_{dd}$ to a load 12. The output voltage $V_{dd}$ of the battery 10 is the supply voltage of the tripler 50.

Figure 2B:
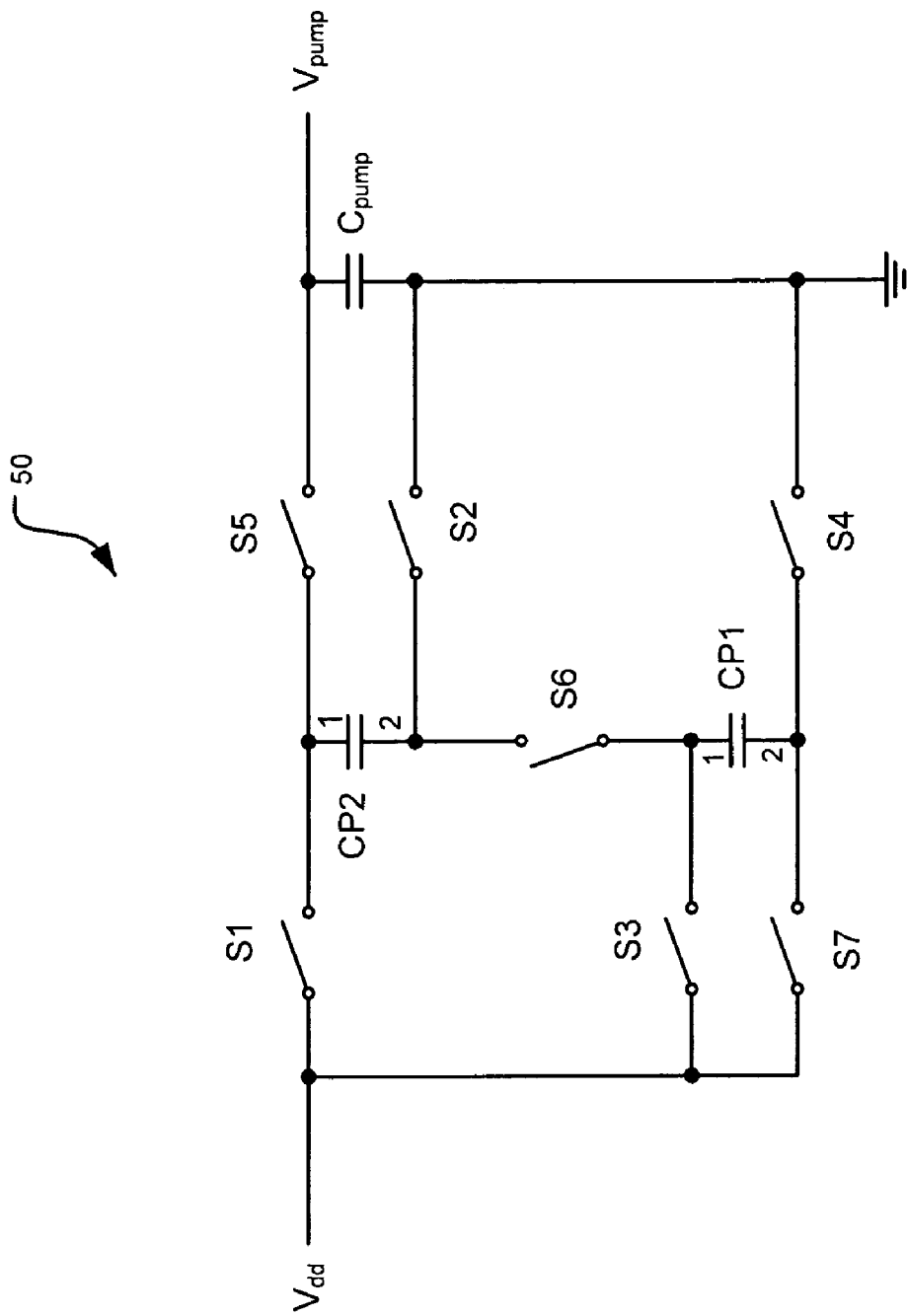
FIG. 2B is a schematic of a two-phase voltage tripler.
Figure 2C:
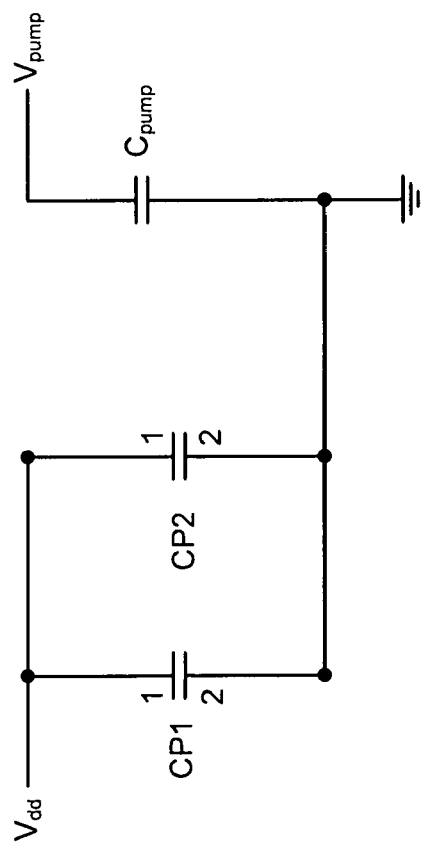
FIG. 2C is a schematic of the two-phase voltage tripler of FIG. 2B operating in charging phase.

The tripler 50 comprises two input capacitors CP1 and CP2, a storage capacitor $C_{pump}$, and seven switches S1 through S7 as shown in FIG. 2B. The tripler 50 operates in cycles. Each cycle comprises two phases: a charging phase and a charge transfer phase (i.e., a transfer phase). In the charging phase, switches S1 through S4 are closed, and switches S5 through S7 are open. The tripler 50 operates as shown in FIG. 2C. Specifically, capacitors CP1 and CP2 are connected in parallel to $V_{dd}$. Both CP1 and CP2 charge to $V_{dd}$.

Figure 2D:
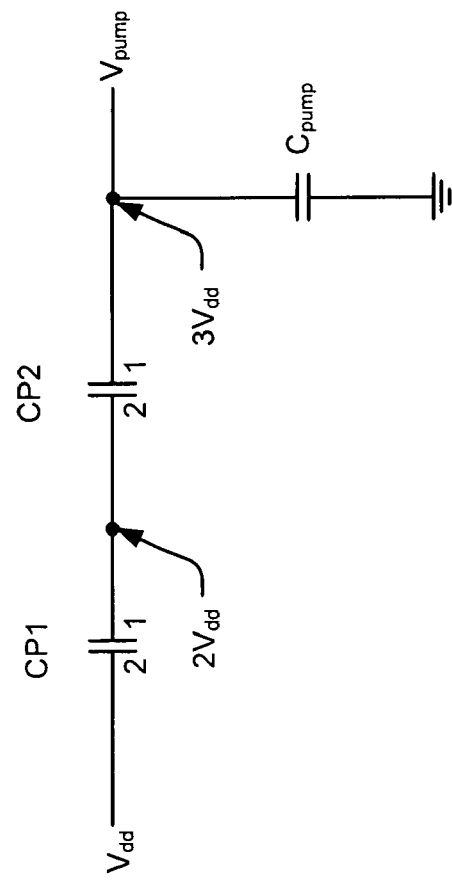
FIG. 2D is a schematic of the two-phase voltage tripler of FIG. 2B operating in transfer phase.
Figure 2E:
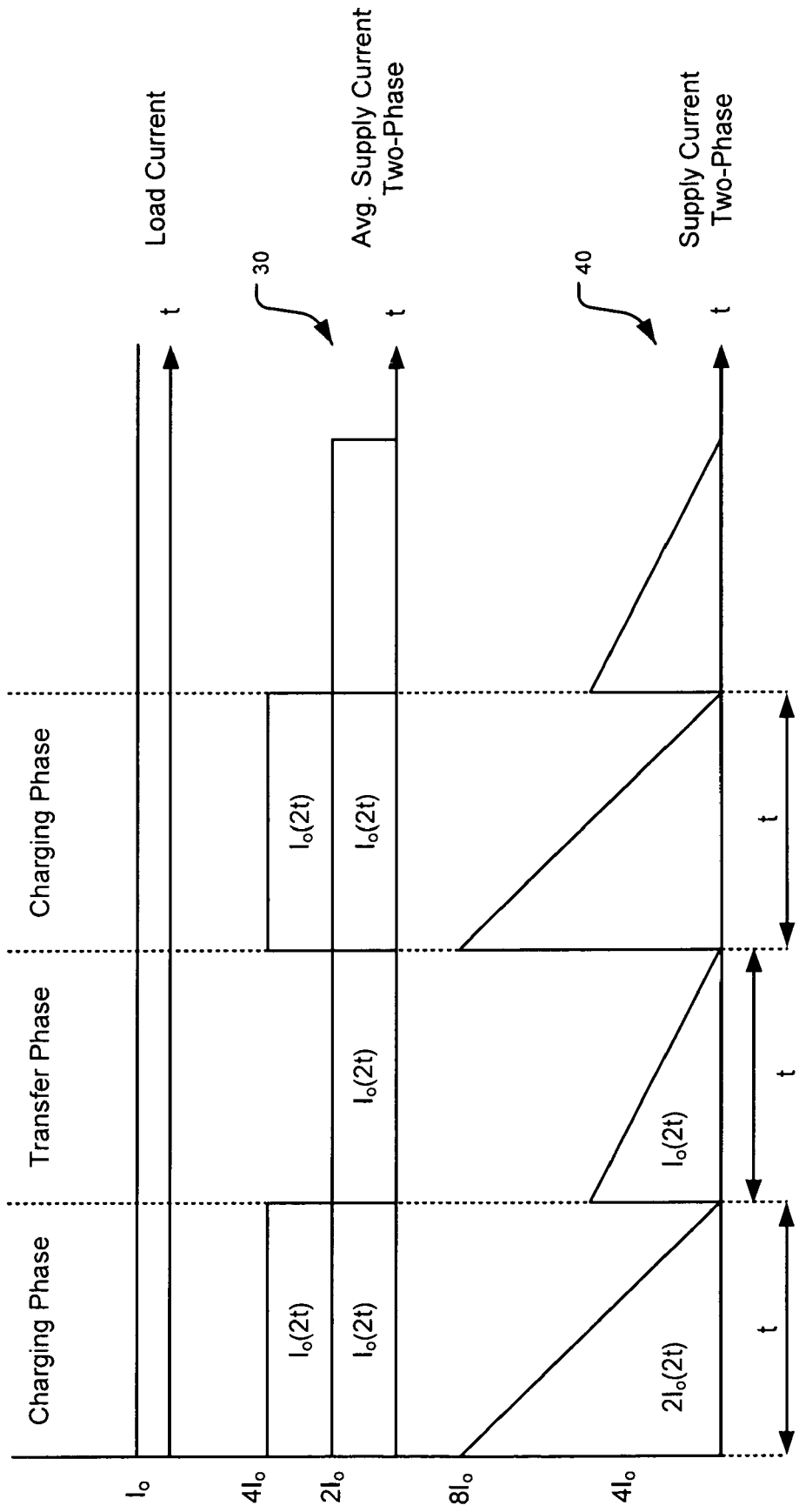
FIG. 2E is a graph of supply current drawn by the two-phase voltage tripler of FIG. 2B relative to time in charging and transfer phases while maintaining a substantially constant load current.

In the transfer phase, switches S1 through S4 are opened and switches S5 through S7 are closed as shown in FIG. 2D. Specifically, capacitors CP1 and CP2 are connected in series. Charges stored in CP1 and CP2 in the charging phase are transferred to the storage capacitor $C_{pump}$. Additionally, one end of CP1, which was connected to a common voltage in the charging phase, is now connected to $V_{dd}$. Thus, the voltage at a second end of CP1, which is connected to CP2, is $2V_{dd}$, and $V_{pump}=3V_{dd}$.

Let $I_o$ denote a load current drawn by the load 12 from the battery 10. To maintain the load current substantially constant at $I_o$, the tripler 50 transfers an average charge equal to $3*I_o*(2t)$ from $V_{dd}$ to $V_{pump}$ in each cycle as shown at 30 in FIG. 2E, where 2t is a period of one cycle, and t is a period of one phase.

Specifically, the charge transferred in the charging phase from $V_{dd}$ to each of CP1 and CP2 is equal to $2*I_o*(t)$, where t is a period of the charging phase. In the transfer phase, an additional charge equal to $2*I_o*(t)$ is transferred from $V_{dd}$ to CP1, where t is the period of the transfer phase.

If a current equal to $2I_o$ is used to charge each of CP1 and CP2 in the charging phase, a supply current drawn by the tripler 50 from the battery 10 in the charging phase is equal to $2I_o+2I_o=4I_o$. Additionally, a supply current equal to $2I_o$ is drawn by the tripler 50 from the battery 10 to charge CP1 in the transfer phase. Thus, a total supply current equal to $3I_o$ is drawn from the battery 10 in one cycle of the tripler 50 to maintain the load current substantially constant at $I_o$.

A peak current $I_{pk}$ is an instantaneous value of the supply current drawn by the tripler 50 from the battery 10 at the beginning of each phase. $I_{pk}$ is mathematically obtained as follows. For the charging phase, $(½)*I_{pk}*(t)=2*I_o*(2t)$ gives $I_{pk}=8I_o$. Similarly, for the transfer phase, $(½)*I_{pk}*(t)=I_o*(2t)$ gives $I_{pk}=4I_o$. The supply current is in fact exponential. However, a linear approximation of the supply current is shown for illustrative purposes at 40 in FIG. 2E.

Thus, to supply a substantially constant load current $I_o$, the tripler 50 instantaneously draws $I_{pk}=8*I_o$ in the charging phase and $I_{pk}=4*I_o$ in the transfer phase from the battery 10. The inequality in $I_{pk}$ may generate voltage spikes of different amplitudes in the supply voltage of the tripler 50 although an average supply current drawn by the tripler 50 from the battery 10 during each cycle does not change.

The present disclosure discloses a three-phase voltage tripler that draws a substantially equal peak current in each phase and that draws a lower peak current in each phase than the two-phase voltage tripler 50. Consequently, voltage spikes in a supply voltage of the three-phase voltage tripler are substantially uniform in each cycle. Additionally, an amplitude of the voltage spikes in the supply of the three-phase voltage tripler is less than the amplitude of the voltage spikes in the supply of the two-phase voltage tripler 50.

Figure 3A:
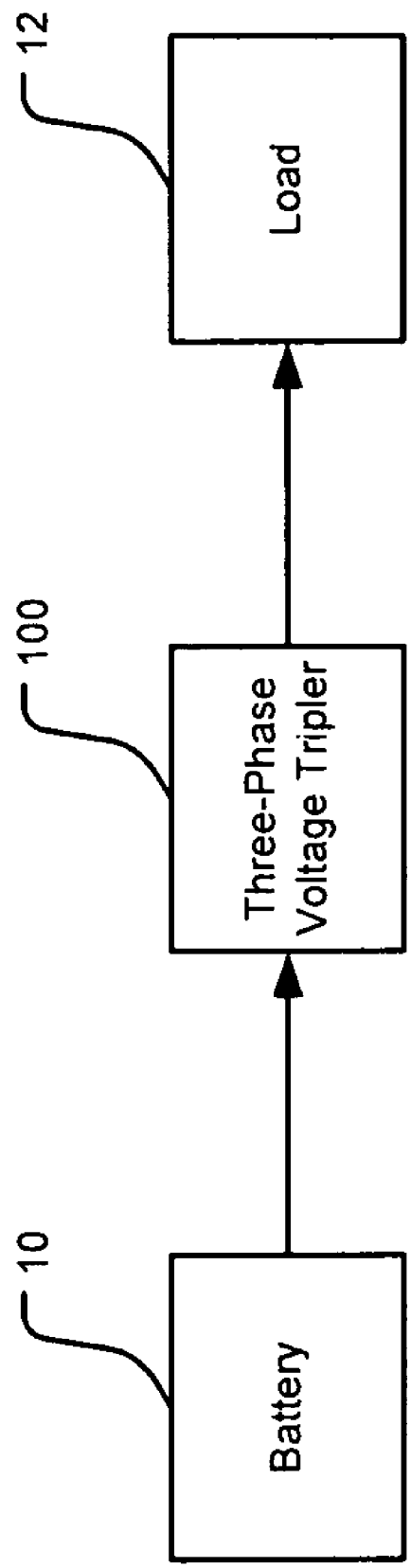
FIG. 3A is a functional block diagram of a three-phase voltage tripler according to the present disclosure.

Referring now to FIGS. 3A-3F, a three-phase voltage tripler (voltage tripler) 100 triples an output voltage of a power supply. For example, the voltage tripler 100 may be used to triple an output voltage $V_{dd}$ of a battery 10 as shown in FIG. 3A. The voltage tripler 100, in turn, outputs a voltage equal to $3V_{dd}$ to a load 12. The output voltage $V_{dd}$ of the battery 10 is the supply voltage of the voltage tripler 100.

Figure 3B:
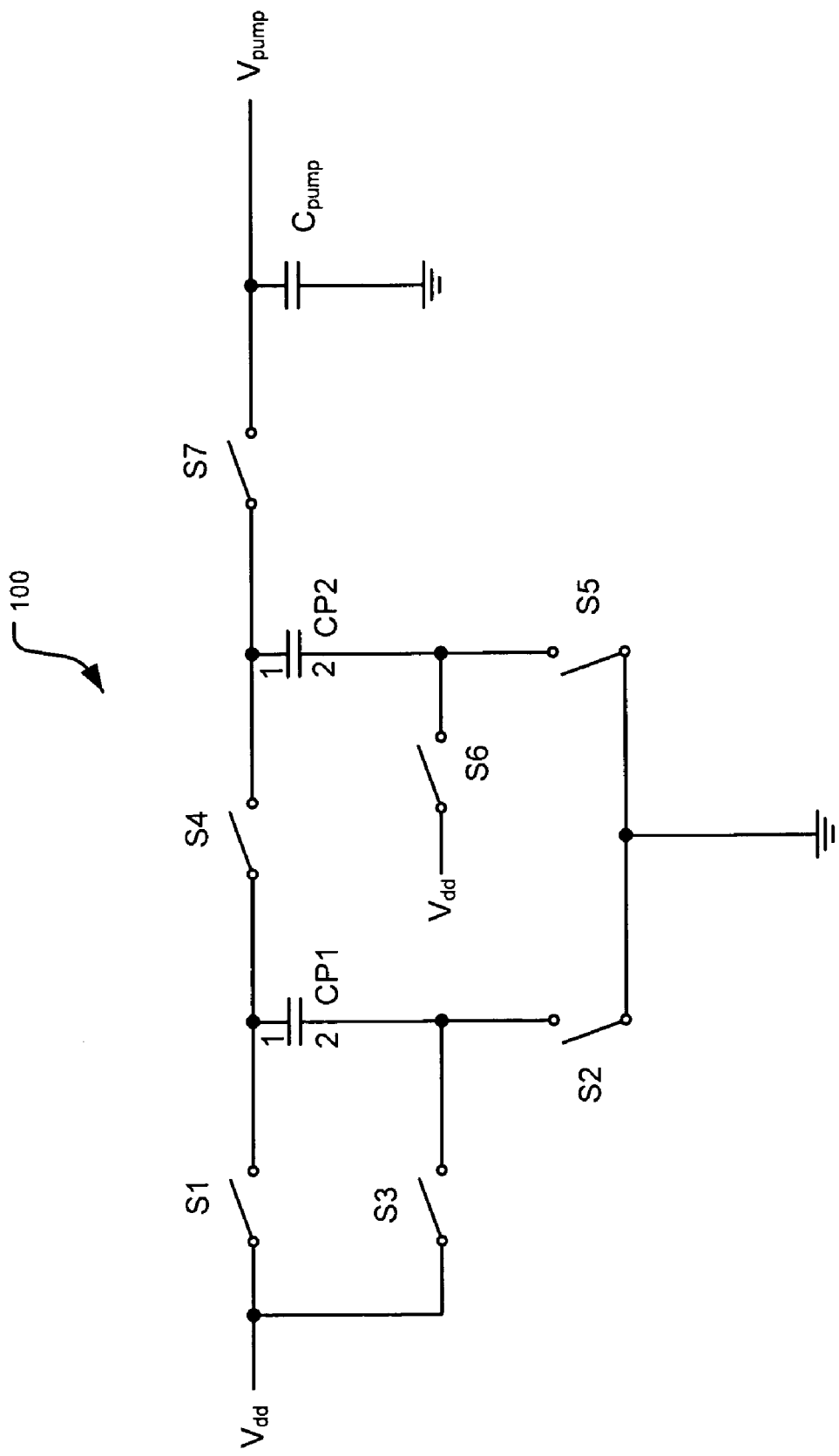
FIG. 3B is a schematic of a three-phase voltage tripler according to the present disclosure.

The voltage tripler 100 comprises two input capacitors CP1 and CP2, a storage capacitor $C_{pump}$, and seven switches S1 through S7 as shown in FIG. 3B. The voltage tripler 100 operates in continuous cycles. Each cycle comprises three phases: a charging phase, a charge transfer phase (i.e., a transfer phase), and a pumping phase. CP1 is charged in the charging phase, and CP2 is charged in the transfer phase as follows.

Figure 3E:
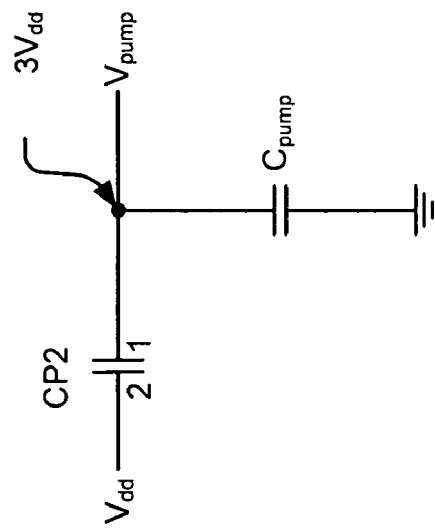
FIG. 3E is a schematic of the three-phase voltage tripler of FIG. 3B operating in pumping phase.
Figure 3D:
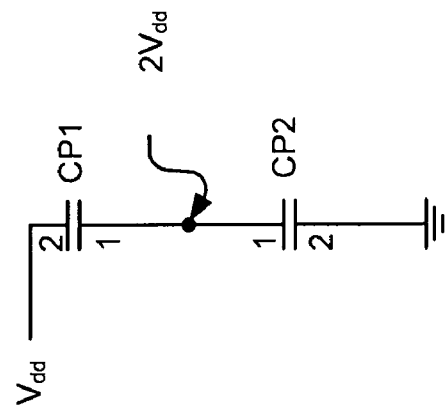
FIG. 3D is a schematic of the three-phase voltage tripler of FIG. 3B operating in transfer phase.
Figure 3C:
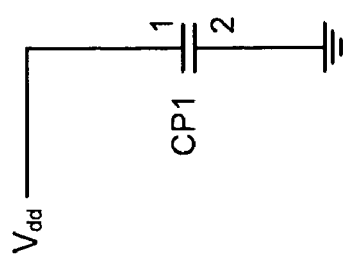
FIG. 3C is a schematic of the three-phase voltage tripler of FIG. 3B operating in charging phase.
Figure 3F:
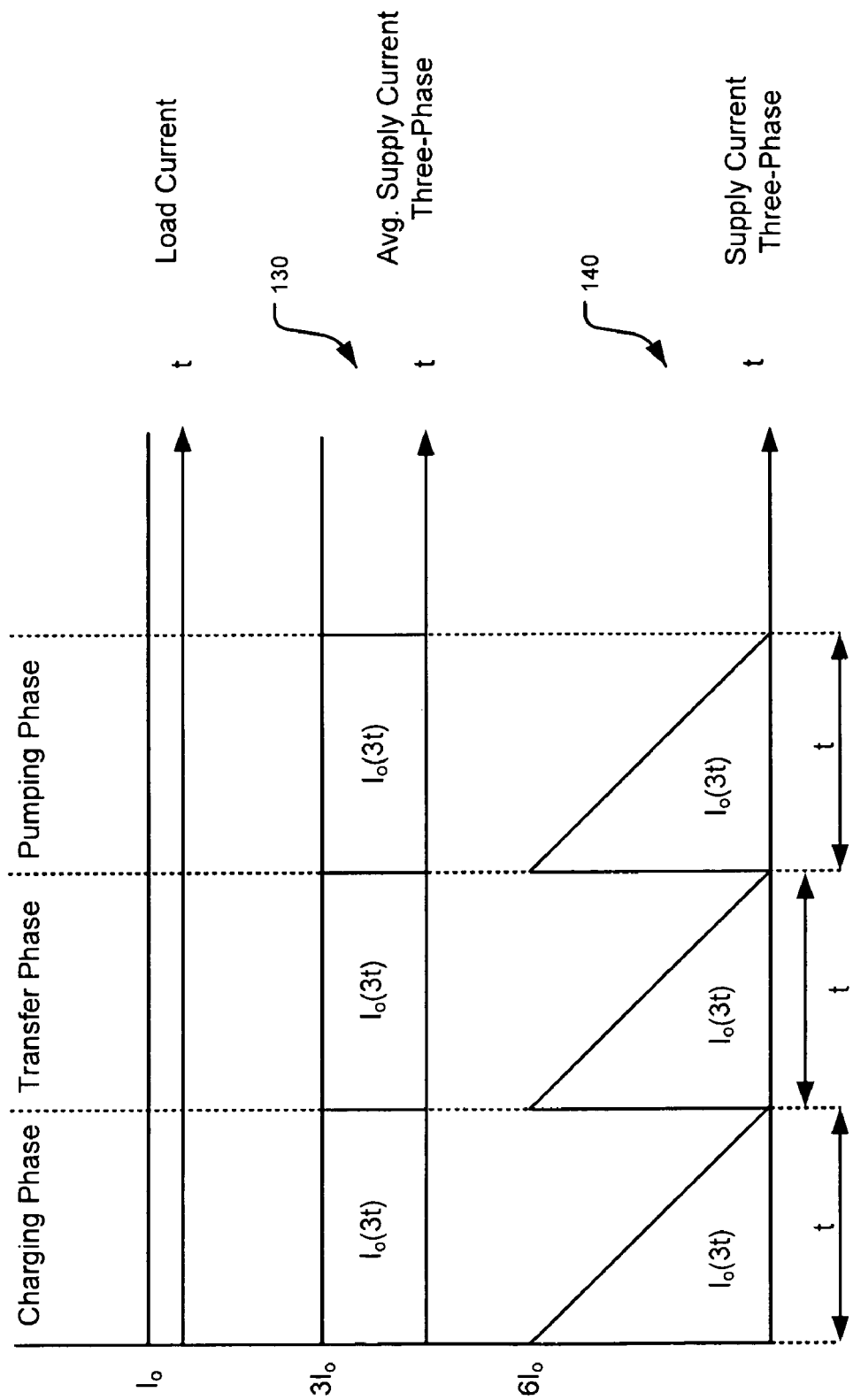
FIG. 3F is a graph of supply current drawn by the three-phase voltage tripler of FIG. 3B relative to time in charging, transfer, and pumping phases while maintaining a substantially constant load current.

In the charging phase, switches S1 and S2 are closed, and switches S3 through S7 are open. The capacitor CP1 charges to $V_{dd}$ as shown in FIG. 3C. In the transfer phase, switches S1 and S2 are opened, and switches S3 through S5 are closed while switches S6 and S7 are still open. Capacitors CP1 and CP2 are connected in series as shown in FIG. 3D. Charge stored in CP1 in the charging phase is transferred from CP1 to CP2. Additionally, one end of CP1, which was connected to a common voltage in the charging phase, is now connected to $V_{dd}$. Thus, both CP1 and CP2 charge to $2V_{dd}$.

In the pumping phase, switches S3 through S5 are opened, and switches S6 and S7 are closed while switches S1 and S2 are still open. The voltage tripler 100 operates as shown in FIG. 3E. Charge stored in CP2 in the transfer phase is transferred to the storage capacitor $C_{pump}$. Additionally, one end of CP2, which was connected to the common voltage in the transfer phase, is now connected to $V_{dd}$. Thus, $V_{pump}=3*V_{dd}$.

Let $I_o$ denote a load current drawn by the load 12 from the battery 10. To maintain the load current substantially constant at $I_o$, the voltage tripler 100 transfers an average charge equal to $3*I_o*(3t)$ from $V_{dd}$ to $V_{pump}$ in each cycle as shown at 130 in FIG. 3F, where 3t is a period of one cycle, and t is a period of one phase.

Specifically, the charge transferred in the charging phase from $V_{dd}$ to CP1 is equal to $3*I_o*(t)$, where t is a period of the charging phase. In the transfer phase, an additional charge equal to $3*I_o*(t)$ is transferred from $V_{dd}$ to CP2, where t is the period of the transfer phase. Finally, in the pumping phase, an additional charge equal to $3*I_o*(t)$ is transferred from $V_{dd}$ to $C_{pump}$. Thus, $V_{pump}=3*V_{dd}$.

If a current equal to $3I_o$ is used to charge each of CP1, CP2, and $C_{pump}$ in the respective phases, a supply current drawn by the voltage tripler 100 from the battery 10 in each of the three phases is substantially equal to $3I_o$. Consequently, an instantaneous value of the supply current or a peak current $I_{pk}$ drawn by the voltage tripler 100 from the battery 10 at the beginning of each phase is also equal in each of the three phases.

$I_{pk}$ is mathematically obtained as follows. For each phase, $(\frac{1}{2})*I_{pk}*(t)=3*I_o*(t)$ gives $I_{pk}=6I_o$. Thus, to supply a substantially constant load current $I_o$, the voltage tripler 100 instantaneously draws $I_{pk}=6I_o$ in each phase from the battery 10. The supply current is in fact exponential. However, a linear approximation of the supply current is shown for illustrative purposes at 140 in FIG. 3F.

Figure 4:
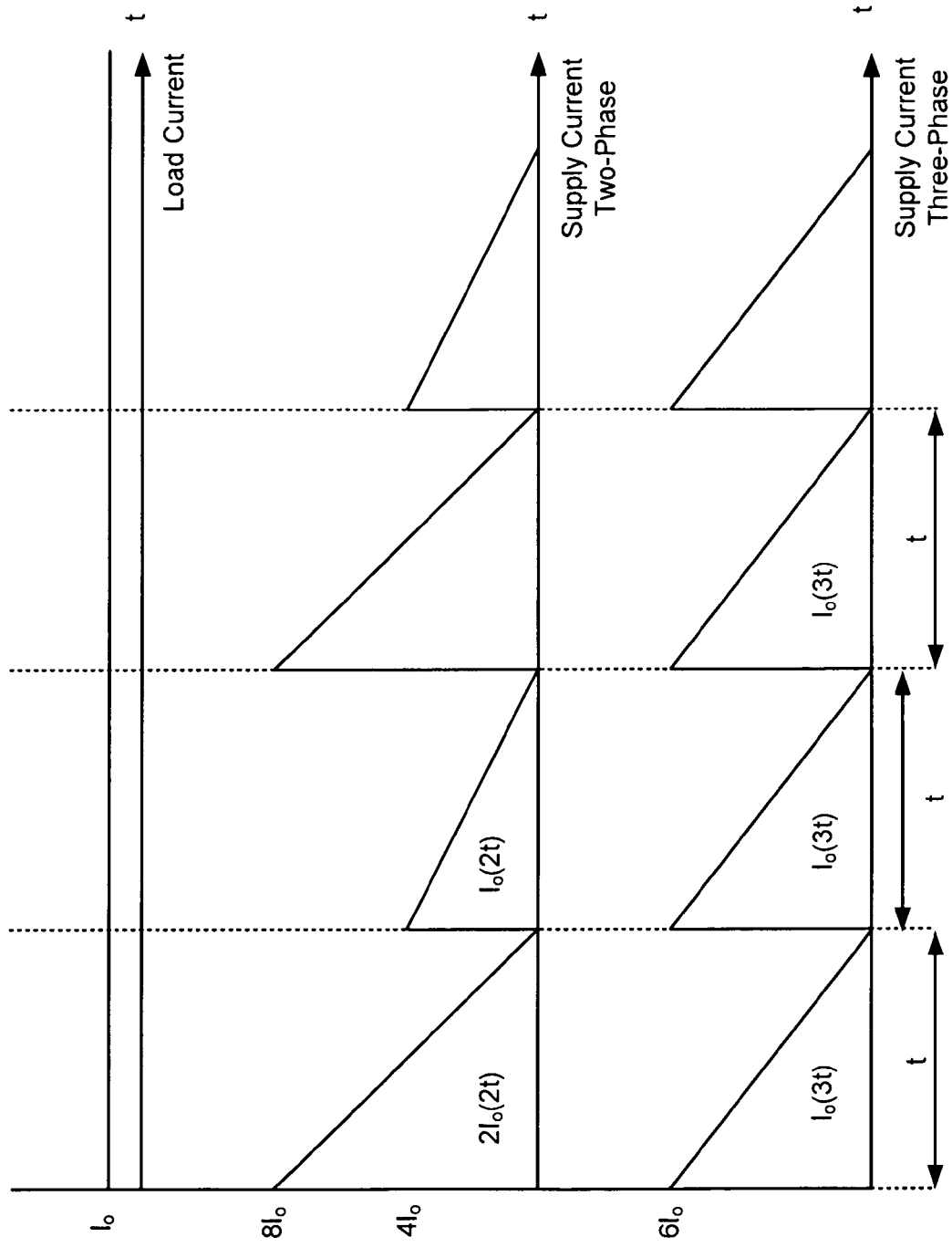
FIG. 4 is a graph of supply current drawn by the two-phase voltage tripler of FIG. 2B and by the three-phase voltage tripler of FIG. 3B relative to time while maintaining a substantially constant load current.

Referring now to FIG. 4, to supply a substantially constant load current $I_o$, the three-phase voltage tripler 100 draws less peak current from the battery 10 than the two-phase voltage tripler 50. Additionally, unlike the two-phase voltage tripler 50, which draws unequal peak currents in charging and transfer phases, the three-phase voltage tripler 100 draws substantially equal peak current in each phase.

Consequently, the supply voltage of the three-phase voltage tripler 100 may have lower voltage spikes than the supply voltage of the two-phase voltage tripler 50. Additionally, the voltage spikes in the output voltage of the three-phase voltage tripler 100 may be substantially uniform. Thus, the battery 10 may last longer when the three-phase voltage tripler 100 is used than when the two-phase voltage tripler 50 is used. Finally, input decoupling capacitors used in the three-phase voltage tripler 100 may be smaller than the input decoupling capacitors used in the two-phase voltage tripler 50 for the same ripple in the supply voltage.

Figure 5A:
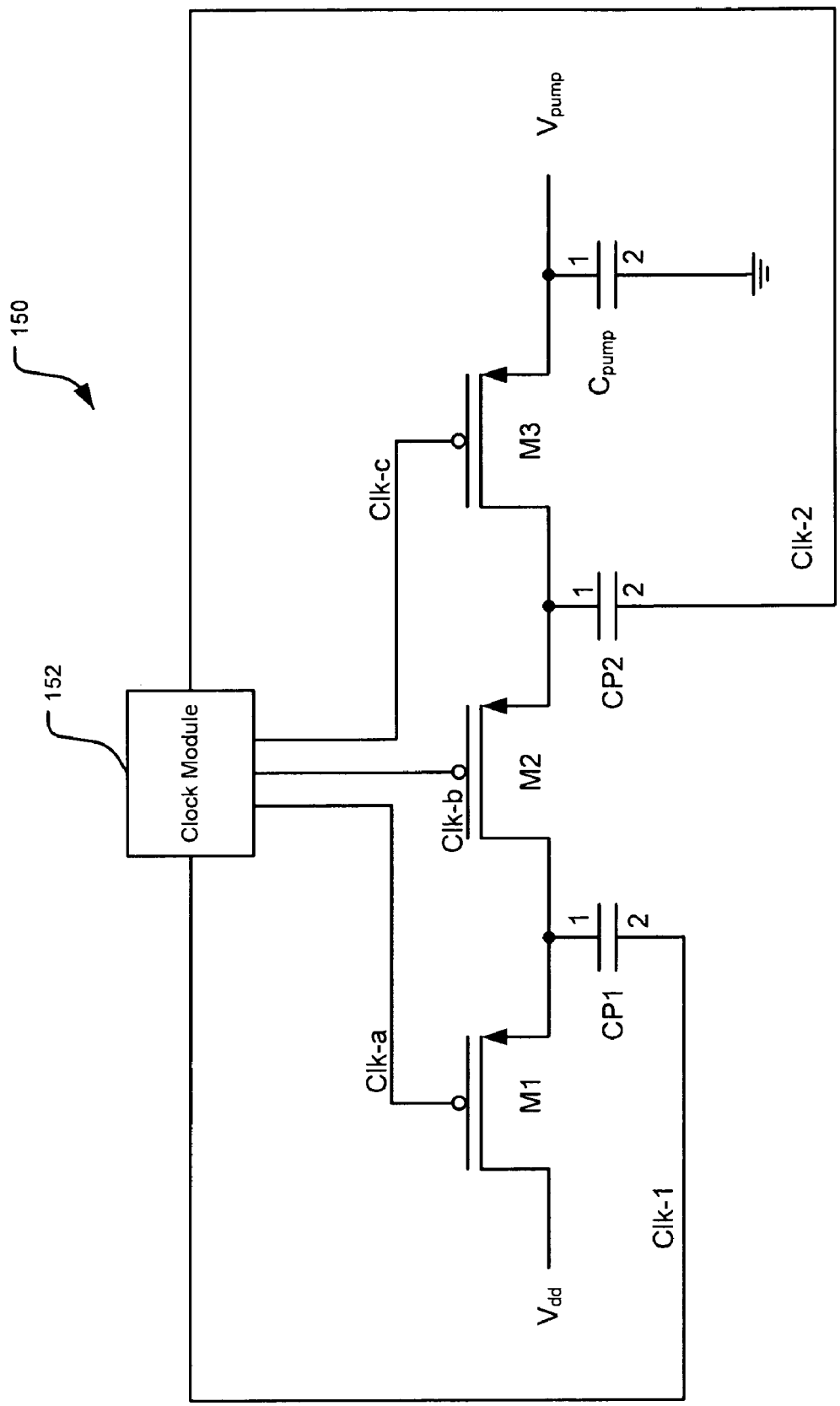
FIG. 5A is a schematic of an exemplary implementation of the three-phase voltage tripler of FIG. 3B.
Figure 5B:
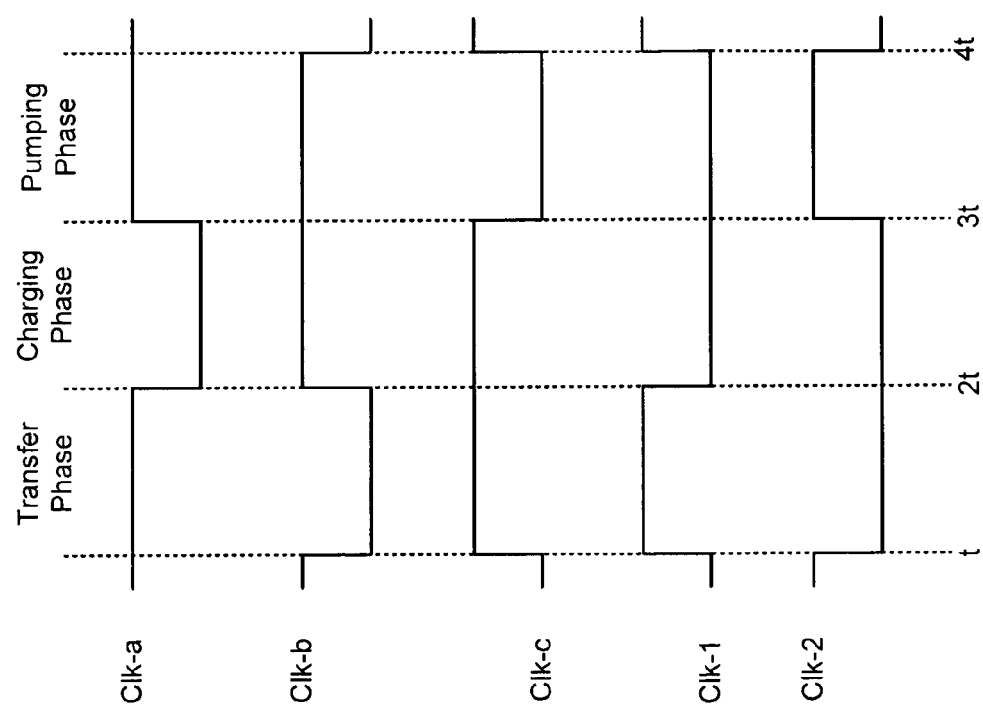
FIG. 5B is a timing diagram of various clock signals generated by a clock generator module to implement the three-phase voltage tripler of FIG. 3B.

Referring now to FIGS. 5A-5B, an exemplary voltage tripler circuit 150 that implements the three-phase voltage tripler 100 comprises a clock module 152, three PMOS transistors (switches) M1, M2, and M3, and three capacitors CP1, CP2, and $C_{pump}$. Although PMOS transistors are shown, NMOS transistors or other components capable of performing a switching operation may be used instead.

The clock module 152 generates clock signals that synchronize switching of transistors M1, M2, and M3 and charging of capacitors CP1, CP2, and $C_{pump}$ as shown in FIG. 5B. That is, the clock signals sequence the charging, transition, and pumping phases of the voltage tripler circuit 150 as shown in FIG. 5B. The sequence of the charging phase and the transfer phase may be exchangeable.

Specifically, the clock module 152 generates three clock signals clk-a, clk-b, and clk-c that bias the three PMOS switches M1, M2, and M3, respectively. The three PMOS switches M1, M2, and M3 open and close at times determined by the three clock signals clk-a, clk-b, and clk-c, respectively. Additionally, the clock module 152 generates clock signals clk-1 and clk-2 that bias input capacitors CP1 and CP2 as shown in FIG. 5B.

In the charging phase, clk-a biases M1 to saturation. That is, switch M1 is closed. Thus, a first plate of CP1 is connected to $V_{dd}$. clk-b and clk-c do not bias M2 and M3 to saturation, respectively. That is, switches M2 and M3 are open. Thus, CP2 and $C_{pump}$ do not communicate with CP1 and/or $V_{dd}$. clk-1 and clk-2 bias second plates of CP1 and CP2 to a common voltage, respectively. Thus, at the end of the charging phase, the first plate of CP1 is charged to $V_{dd}$ while the second plate of CP1 is held at the common voltage by clk-1.

In the transfer phase, clk-a biases M1 out of saturation. That is, switch M1 is opened. Thus, $V_{dd}$ is not connected to the first plate of CP1. clk-b biases M2 to saturation. That is, switch M2 is closed. Thus, the first plate of CP1 is connected to a first plate of CP2. Charge stored in CP1 is transferred to CP2. Additionally, clk-1 biases the second plate of CP1 to $V_{dd}$ while clk-2 still holds the second plate of CP2 at the common voltage. Thus, the first plate of CP2 is charged to $2V_{dd}$ at the end of the transfer phase. Since clk-c still does not bias M3 to saturation (i.e., since switch M3 is still open), $C_{pump}$ is not yet connected to CP2, CP1, or $V_{dd}$.

In the pumping phase, clk-c biases M3 to saturation. That is, switch M3 is closed. clk-b biases M2 out of saturation (i.e., switch M2 is opened) while clk-a still keeps M1 out of saturation (i.e., switch M1 is still open). Thus, the first plate of CP2 is connected to the first plate of $C_{pump}$. Charge stored in CP2 is transferred to $C_{pump}$. Additionally, clk-2 biases the second plate of CP2 to $V_{dd}$. Thus, the first plate of $C_{pump}$ is charged to $3V_{dd}$ at the end of the pumping phase, and $V_{pump}=3V_{dd}$. That is, $V_{pump}$ or an output voltage of the voltage tripler circuit 150 equals three times the output voltage $V_{dd}$ of a power supply or a battery 10.

Figure 6:
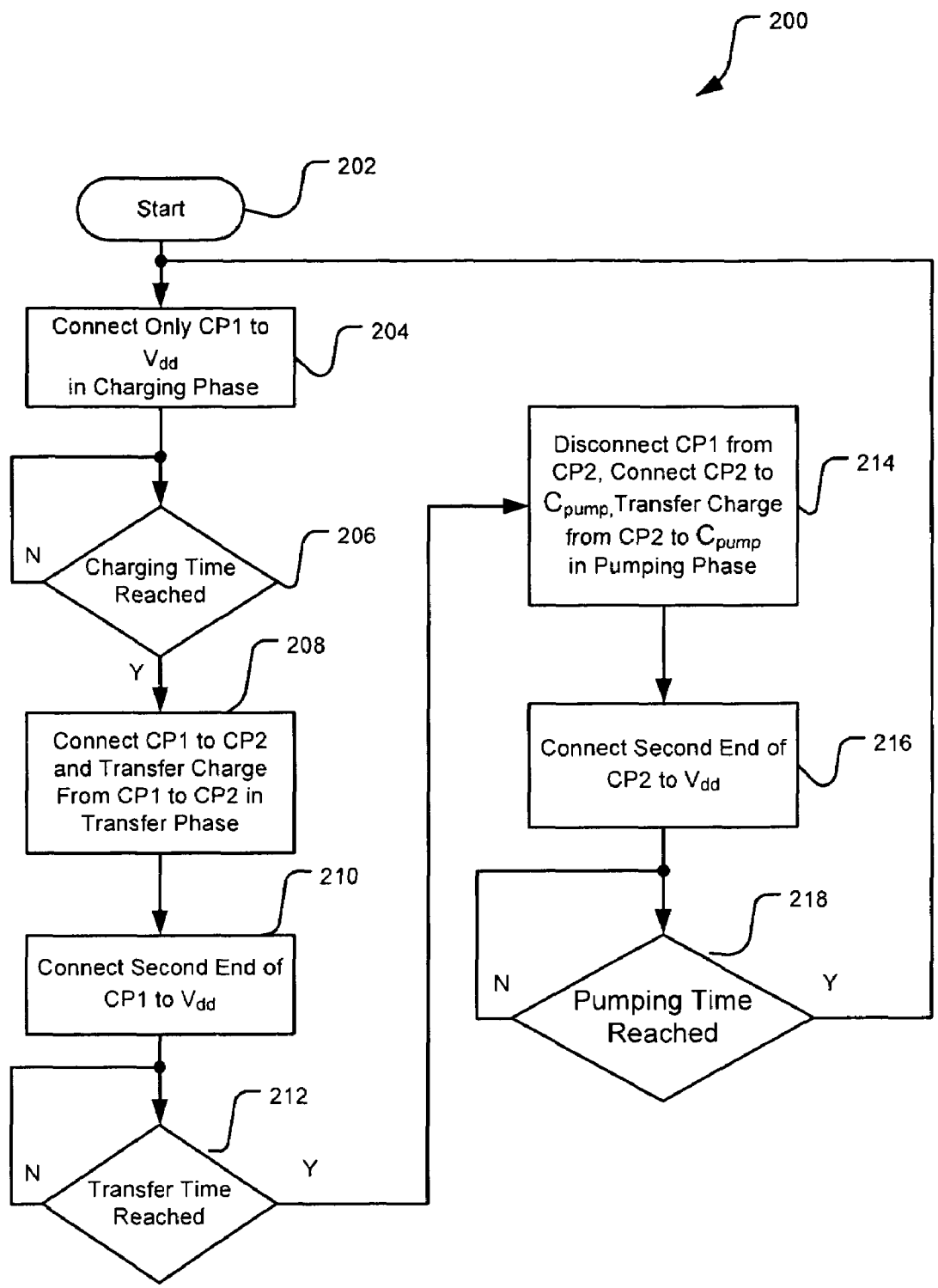
FIG. 6 is a flowchart of a method for implementing the three-phase voltage tripler of FIG. 3B.

Referring now to FIG. 6, a method 200 for reducing and regulating voltage spikes in a three-phase voltage tripler 100 begins at step 202. A first end of a first input capacitor CP1 is connected to a supply voltage $V_{dd}$ of a power source such as a battery 10 and a second end of CP1 is connected to a common node in a charging phase in step 204. Whether the first end of CP1 is charged to $V_{dd}$ is determined in step 206. Step 206 is repeated until charging time is reached.

When the first end of CP1 is charged to $V_{dd}$, the first end of CP1 is disconnected from $V_{dd}$ and is connected to a first end of a second input capacitor CP2, and the charge is transferred from the first end of CP1 to the first end of CP2 in a transfer phase in step 208. The second end of CP1 is disconnected from the common node and is connected to $V_{dd}$, and a second end of CP2 is connected to the common node during the transfer phase in step 210.

Whether the first end of CP2 is charged to $2V_{dd}$ is determined in step 212. Step 212 is repeated until transfer time is reached. When the first end of CP2 is charged to $2V_{dd}$, the first end of CP2 is disconnected from the first end of CP1 and is connected to $C_{pump}$, and the charge is transferred from the first end of CP2 to $C_{pump}$ in a pumping phase in step 214. The second end of CP2 is disconnected from the common node and is connected to $V_{dd}$ in step 216. Whether $C_{pump}$ is charged to $3V_{dd}$ is determined in step 218. Step 218 is repeated until pumping time is reached. Once $C_{pump}$ is charged to $3V_{dd}$, the method 200 ends, and steps 204 through 218 are repeated.

Figure 7A:
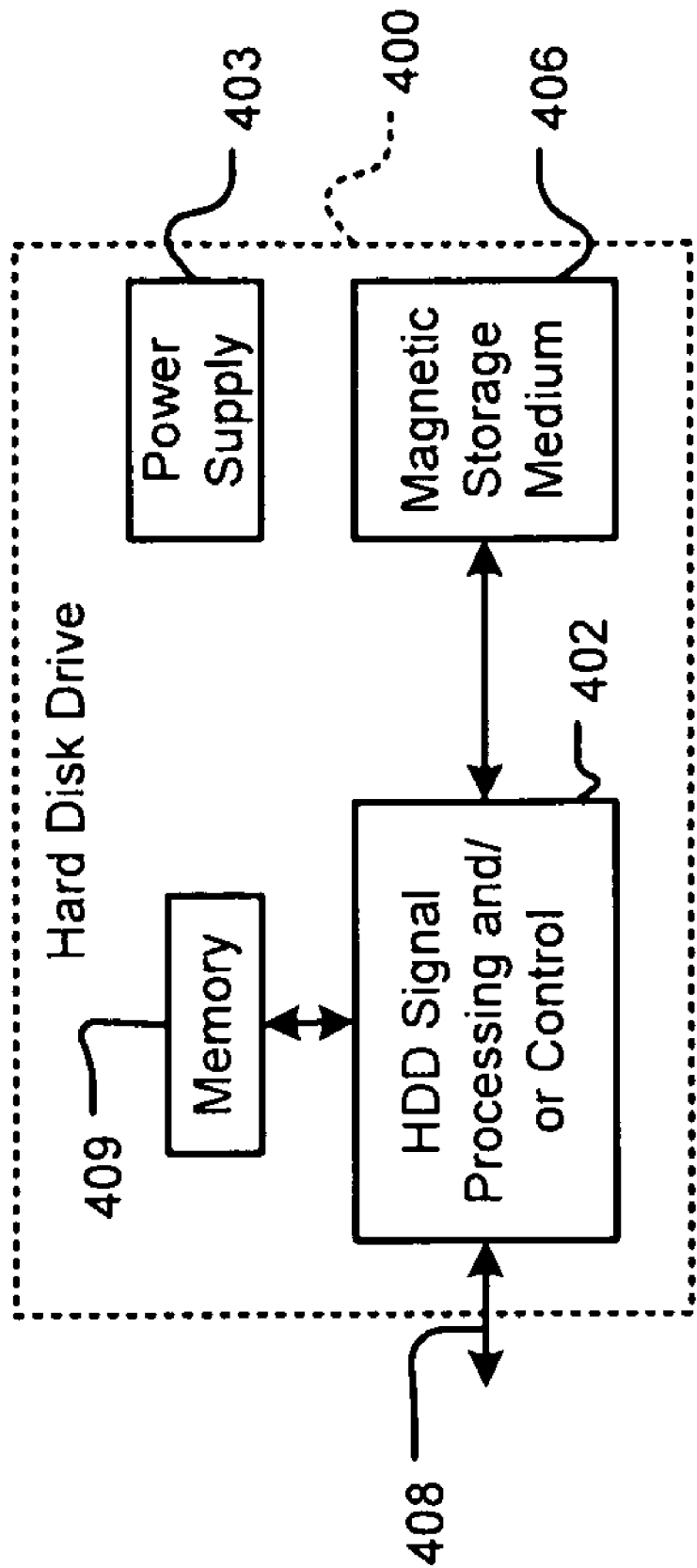
FIG. 7A is a functional block diagram of a hard disk drive.

Referring now to FIGS. 7A-7G, various exemplary implementations of the three-phase voltage tripler 100 including the voltage tripler circuit 150 (hereinafter collectively referred to as the three-phase voltage tripler) are shown. Referring now to FIG. 7A, the three-phase voltage tripler can be implemented in a power supply 403 of a hard disk drive 400. In some implementations, a signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 7B, the three-phase voltage tripler can be implemented in a power supply 413 of a digital versatile disc (DVD) drive 410. In some implementations, a signal processing and/or control circuit 412 and/or other circuits (not shown) in the DVD 410 may process data, perform coding and/or encryption, perform calculations, and/or format data that is read from and/or data written to an optical storage medium 416. The signal processing and/or control circuit 412 and/or other circuits (not shown) in the DVD 410 may also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 7A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Referring now to FIG. 7C, the three-phase voltage tripler can be implemented in a power supply 423 of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 7A and/or at least one DVD may have the configuration shown in FIG. 7B. The HDD may be a mini HDD that includes one or more platters having a diameter that is smaller than approximately 1.8"The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Figure 7E:
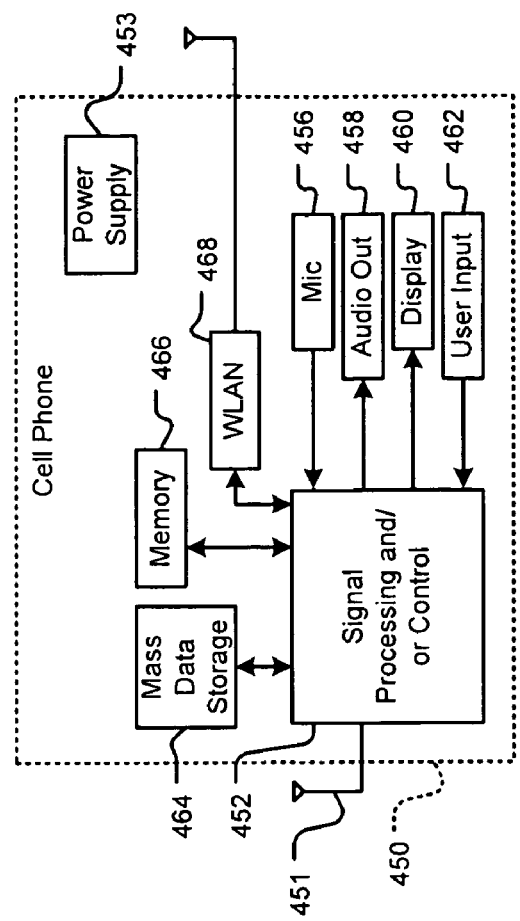
FIG. 7E is a functional block diagram of a cellular phone.
Figure 7D:
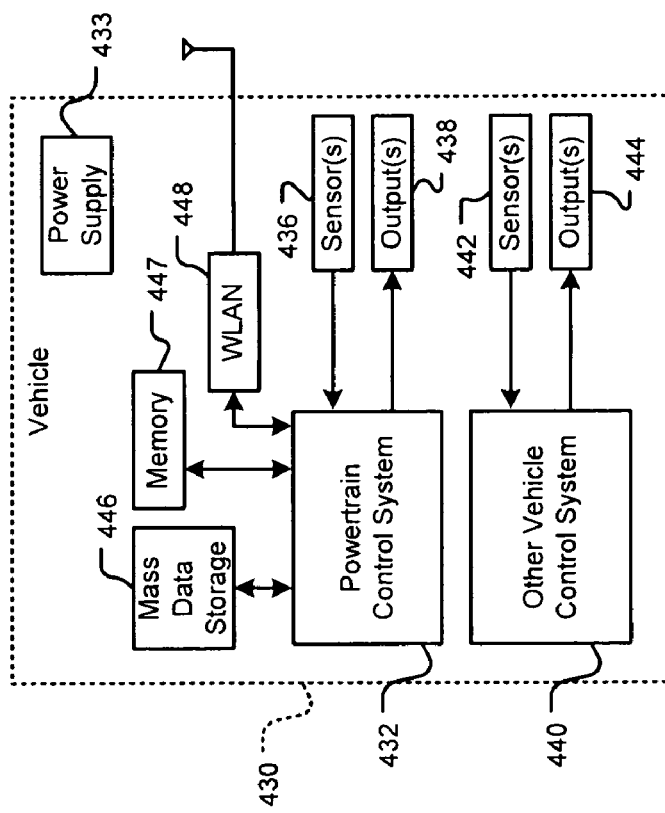
FIG. 7D is a functional block diagram of a vehicle control system.

Referring now to FIG. 7D, the three-phase voltage tripler may be implemented in a power supply 433 of a control system of a vehicle 430. In some implementations, a powertrain control system 432 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8".

The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Referring now to FIG. 7E, the three-phase voltage tripler can be implemented in a power supply 453 of a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8"The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 7F:
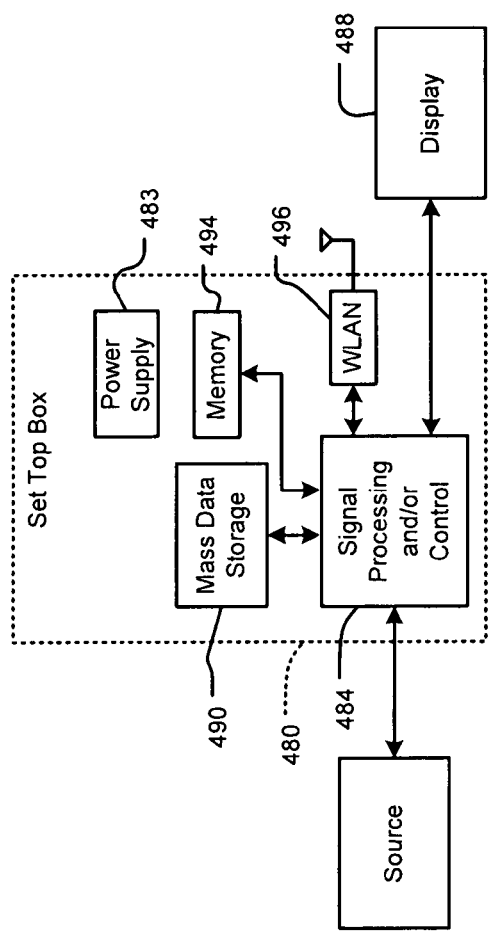
FIG. 7F is a functional block diagram of a set top box.

Referring now to FIG. 7F, the three-phase voltage tripler can be implemented in a power supply 483 of a set top box 480. The set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Figure 7G:
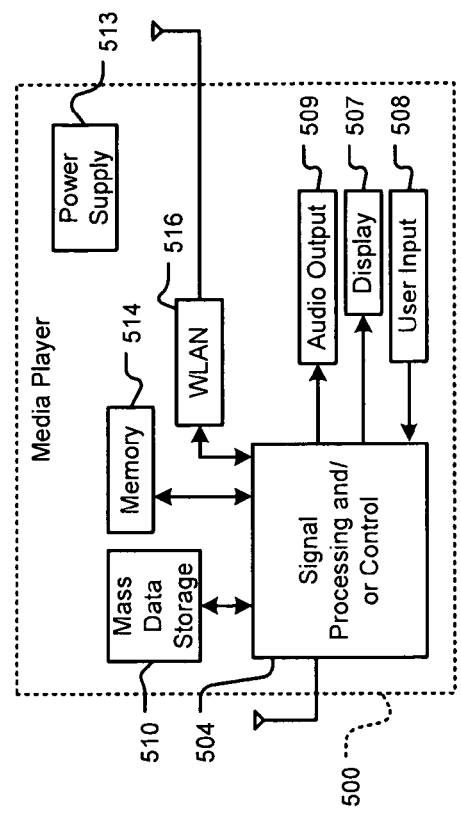
FIG. 7G is a functional block diagram of a media player.

Referring now to FIG. 7G, the three-phase voltage tripler can be implemented in a power supply 503 of a media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 7A and/or at least one DVD may have the configuration shown in FIG. 7B. The HDD may be a mini HDD that includes one or more platters having a diameter that is smaller than approximately 1.8".

The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A three-phase voltage tripler, comprising:
   first, second, and third capacitive elements; and
   a switching module that selectively switches connections among said capacitive elements and between said capacitive elements and a reference voltage during first, second, and third periods,
   wherein said switching module charges said first capacitive element to a first voltage level during said first period, said second capacitive element to a second voltage level during said second period, and said third capacitive element to a third voltage level during said third period, and wherein said third voltage level is greater than said second voltage level and said second voltage level is greater than said first voltage level.

2. The three-phase voltage tripler of claim 1 wherein said first voltage level is approximately equal to said reference voltage, said second voltage level is approximately equal to two times said first voltage level, and said third voltage is approximately equal to three times said first voltage level.

3. The three-phase voltage tripler of claim 1 wherein said switching module comprises:
   a plurality of switches; and
   a clock module that generates clock signals that selectively control said plurality of switches.

4. The three-phase voltage tripler of claim 3 wherein said plurality of switches comprise:
   a first transistor having a first terminal that communicates with said reference voltage, a control terminal, and a second terminal that communicates with a first end of said first capacitive element;
   a second transistor having a first terminal that communicates with said second terminal of said first transistor, a control terminal, and a second terminal that communicates with a first end of said second capacitive element;
   a third transistor having a first terminal that communicates with said second terminal of said second transistor, a control terminal, and a second terminal that communicates with a first end of said third capacitive element,
   wherein said clock module selectively biases said first, second, and third transistors during said first, second, and third periods.

5. The three-phase voltage tripler of claim 1 wherein substantially the same peak current is drawn during said first, second, and third periods from a source of said reference voltage when said three-phase voltage tripler supplies a predetermined load current.

6. The three-phase voltage tripler of claim 1 wherein during said first period, a first end of said first capacitive element communicates with said reference voltage and a second end of said first capacitive element communicates with a common voltage.

7. The three-phase voltage tripler of claim 6 wherein during said second period, said first end of said first capacitive element communicates with a first end of said second capacitive element, said second end of said first capacitive element communicates with said reference voltage, and a second end of said second capacitive element communicates with said common voltage.

8. The three-phase voltage tripler of claim 7 wherein during said third period, said first end of said second capacitive element communicates with a first end of said third capacitive element, said second end of said second capacitive element communicates with said reference voltage, and a second end of said third capacitive element communicates with said common voltage.

9. A method, comprising:
   arranging first, second, and third capacitive elements;
   selectively switching connections among said capacitive elements and between said capacitive elements and a reference voltage during first, second, and third periods; and
   charging said first capacitive element to a first voltage level during said first period, said second capacitive element to a second voltage level during said second period, and said third capacitive element to a third voltage level during said third period, wherein said third voltage level is greater than said second voltage level and said second voltage level is greater than said first voltage level.

10. The method of claim 9 wherein said first voltage level is approximately equal to said reference voltage, said second voltage level is approximately equal to two times said first voltage level, and said third voltage is approximately equal to three times said first voltage level.

11. The method of claim 9 further comprising:
arranging a plurality of switches;
generating clock signals that selectively control said plurality of switches; and
communicating among said capacitive elements, said switches, and said reference voltage based on said clock signals.

12. The method of claim 11 further comprising including first, second, and third transistors in said switches, wherein each of said transistors has first, second, and control terminals, and further comprising:
communicating between said first terminal of said first transistor and said reference voltage;
communicating between said second terminal of said first transistor and a first end of said first capacitive element;
communicating between said first terminal of said second transistor and said second terminal of said first transistor;
communicating between said second terminal of said second transistor and a first end of said second capacitive element;
communicating between said first terminal of said third transistor and said second terminal of said second transistor;
communicating between said second terminal of said third transistor and a first end of said third capacitive element;
communicating said clock signals to said control terminals of said transistors; and
selectively biasing said transistors during said first, second, and third periods.

13. The method of claim 9 further comprising drawing substantially the same peak current during said first, second, and third periods from a source of said reference voltage when supplying a predetermined load current.

14. The method of claim 9 further comprising communicating during said first period between a first end of said first capacitive element and said reference voltage, and between a second end of said first capacitive element and a common voltage.

15. The method of claim 14 further comprising communicating during said second period between said first end of said first capacitive element and a first end of said second capacitive element, between said second end of said first capacitive element and said reference voltage, and between a second end of said second capacitive element and said common voltage.

16. The method of claim 15 further comprising communicating during said third period between said first end of said second capacitive element and a first end of said third capacitive element, between said second end of said second capacitive element and said reference voltage, and between a second end of said third capacitive element and said common voltage.

17. A three-phase voltage tripler, comprising:
first, second, and third capacitive means for providing capacitance; and
switching means for selectively switching connections among said capacitive means and between said capacitive means and a reference voltage during first, second, and third periods,
wherein said switching means charges said first capacitive means to a first voltage level during said first period, said second capacitive means to a second voltage level during said second period, and said third capacitive means to a third voltage level during said third period, and wherein said third voltage level is greater than said second voltage level and said second voltage level is greater than said first voltage level.

18. The three-phase voltage tripler of claim 17 wherein said first voltage level is approximately equal to said reference voltage, said second voltage level is approximately equal to two times said first voltage level, and said third voltage is approximately equal to three times said first voltage level.

19. The three-phase voltage tripler of claim 17 wherein said switching means comprises:
a plurality of switches; and
clock means for generating clock signals that selectively control said plurality of switches.

20. The three-phase voltage tripler of claim 19 wherein said plurality of switches comprise:
a first transistor having a first terminal that communicates with said reference voltage, a control terminal, and a second terminal that communicates with a first end of said first capacitive means;
a second transistor having a first terminal that communicates with said second terminal of said first transistor, a control terminal, and a second terminal that communicates with a first end of said second capacitive means;
a third transistor having a first terminal that communicates with said second terminal of said second transistor, a control terminal, and a second terminal that communicates with a first end of said third capacitive means,
wherein said clock means selectively biases said first, second, and third transistors during said first, second, and third periods.

21. The three-phase voltage tripler of claim 17 wherein substantially the same peak current is drawn during said first, second, and third periods from a source of said reference voltage when said three-phase voltage tripler supplies a predetermined load current.

22. The three-phase voltage tripler of claim 17 wherein during said first period, a first end of said first capacitive means communicates with said reference voltage and a second end of said first capacitive means communicates with a common voltage.

23. The three-phase voltage tripler of claim 22 wherein during said second period, said first end of said first capacitive means communicates with a first end of said second capacitive means, said second end of said first capacitive means communicates with said reference voltage, and a second end of said second capacitive means communicates with said common voltage.

24. The three-phase voltage tripler of claim 23 wherein during said third period, said first end of said second capacitive means communicates with a first end of said third capacitive means, said second end of said second capacitive means communicates with said reference voltage, and a second end of said third capacitive means communicates with said common voltage.

* * * * *

UNITED STATES PATENT AND TRADEMARK OFFICE
CERTIFICATE OF CORRECTION

PATENT NO. : 7,466,572 B1
APPLICATION NO. : 11/585566
DATED : December 16, 2008
INVENTOR(S) : Siew Yong Chui et al.

Page 1 of 1

It is certified that error appears in the above-identified patent and that said Letters Patent is hereby corrected as shown below:

Column 9, Line 62    Insert -- . -- after "1.8"
Column 10, Line 55    Insert -- . -- after "1.8"
Column 11, Line 13    Insert -- . -- after "1.8"

Signed and Sealed this

Third Day of March, 2009

JOHN DOLL
*Acting Director of the United States Patent and Trademark Office*